Nov. 3, 1953        A. J. LIEBMAN ET AL        2,657,912
BEARING SUPPORT FOR VERTICAL AGITATING SHAFTS
Filed April 5, 1952                         2 Sheets-Sheet 2
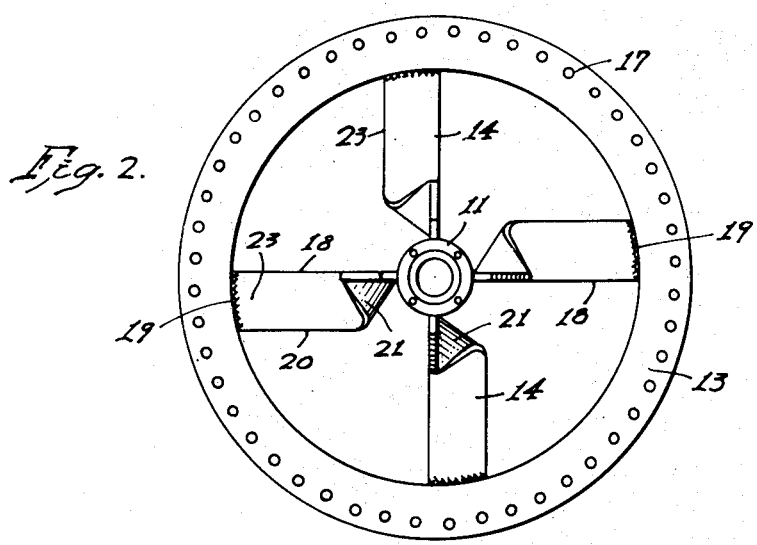
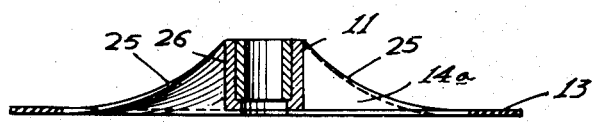
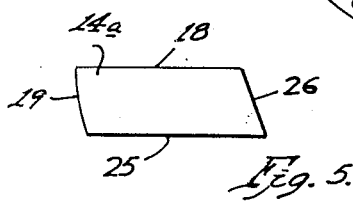
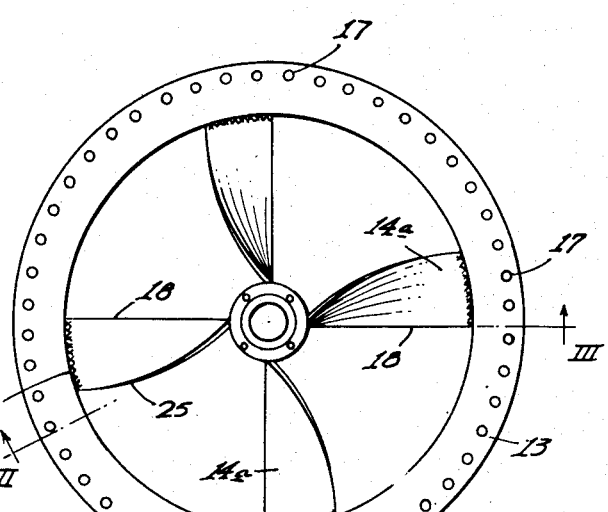
INVENTORS.
Arno J. Liebman and
BY Joseph W. Dorsey.
by Christy, Parmelee & Strickland
ATTORNEYS:—

Patented Nov. 3, 1953

2,657,912

UNITED STATES PATENT OFFICE 2,657,912

BEARING SUPPORT FOR VERTICAL AGITATING SHAFTS

Arno J. Liebman and Joseph W. Dorsey, Pittsburgh, Pa., assignors to Dravo Corporation, Pittsburgh, Pa., a corporation of Pennsylvania Application April 5, 1952, Serial No. 280,738

7 Claims. (Cl. 259—107)

1

This invention, as indicated, relates to an improved bearing support for vertical agitating shafts, and, more particularly, to a bearing support in the nature of a deflecting vane structure for controlling the motion of a fluid being mixed.

In apparatus for mixing fluids, it is common practice to provide a mixing tank having a centrally located and vertically extending agitating shaft. In conventional installations, and for various reasons which need not be specifically mentioned for the purpose of imparting an understanding of this invention, the shaft has bearing supports adjacent its center portion and its upper end, or only at its upper end, its lower end being free. In such case, the free lower end may whip or move otherwise under the influence of the fluid being mixed, and, in so moving, will subject its upper bearing supports to unusually heavy loads. The maintenance of the upper bearing supports because of such loads presents a difficult problem. The immensity of this problem will be better appreciated when it is considered that typical installations of mixing apparatus of this type frequently have an overall height of over 20 feet, diameter of about 10 feet, and the agitating shaft may extend as much as 10 feet and more below its uppermost bearing.

The elimination of the problem of maintaining the upper bearing supports is one of the principal objects of this invention. A further object is to provide a bearing support for the lower end of the agitating shaft which is constructed in such manner that it will not interfere with the motion of the liquid being mixed, and may, if desired, assist in the mixing of the fluid. Still another object of the invention is to provide a bearing support in which the supporting elements for the bearing are deflector vanes, and in which the bearing and its supporting elements may be removed and replaced as needed.

To these and related ends, the bearing of this invention comprises a bearing housing in which the lower end of the agitating shaft is received and journaled, and a mounting ring for connection to the side walls of the container in which the shaft is positioned. The housing is carried on the mounting ring through metal straps which form deflector vanes in a manner to be described.

Other objects and advantages of the invention will become apparent from the following description.

In the drawings, there are shown two embodiments of bearings constructed in accordance with the principles of this invention. In this showing:

2

Fig. 2 is an enlarged plan view of the bearing support shown in Fig. 1;

Fig. 3 is a vertical sectional view of a modified form of bearing support;

Fig. 4 is a plan view of the support shown in Fig. 3; and

Fig. 5 is a plan view of one of the supporting straps or mounting elements of the bearing shown in Figs. 3 and 4 prior to being subjected to its final twisting or shaping action.

Figure 1:
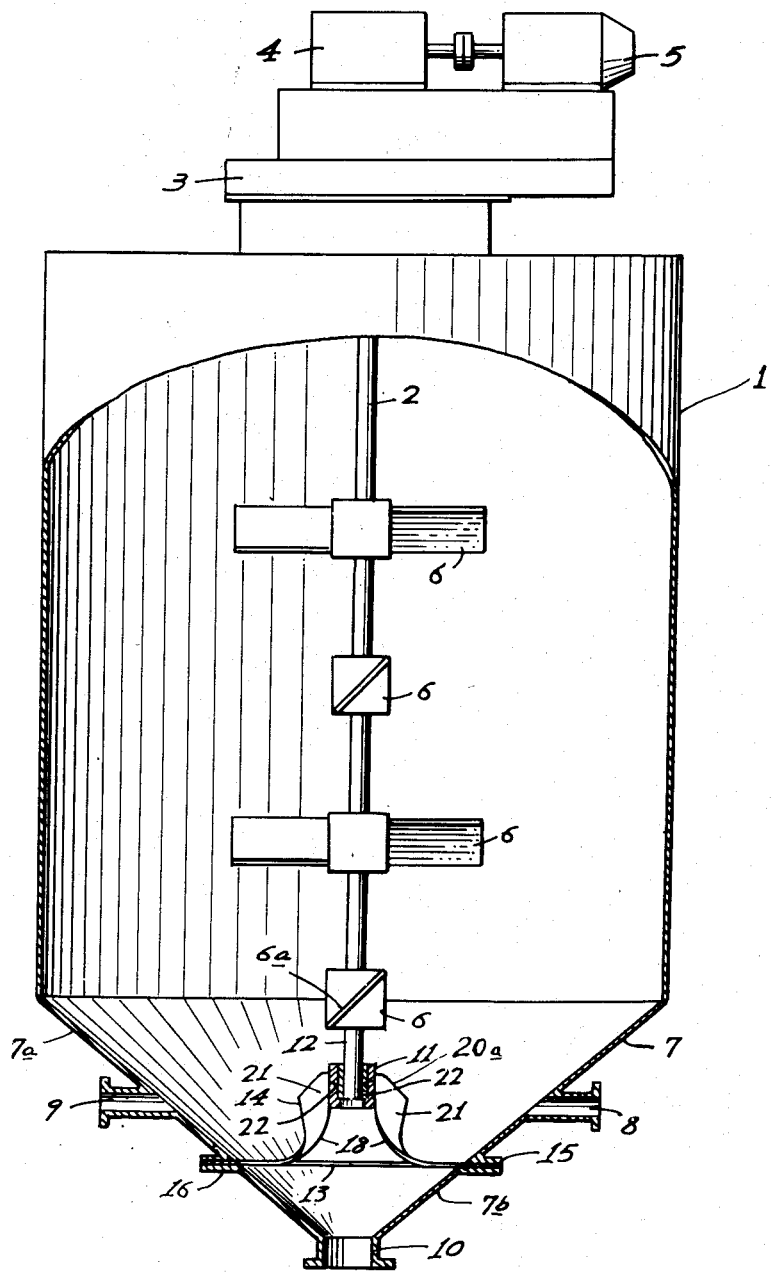
Fig. 1 is a side elevational view of mixing apparatus of the type with which this invention is concerned, a portion thereof being broken away and shown in vertical section to thereby render visible the bearing support of this invention.

Referring to Fig. 1 of the drawings, numeral 1 designates a cylindrical container having a vertically extending agitating shaft 2 mounted therein. The upper end of the shaft 2 is supported by a framework 3 and has a driving connection through a speed reducer 4 with an electric drive motor 5. The shaft 2 mounts plural sets of agitating blades 6 of conventional structure. One or more sets of agitating blades as at 6a may have a reverse pitch, instead of a similar pitch as illustrated, to increase the mixing action of the fluid which may be contained in the tank. The bottom 7 of the tank is shown to be of conical shape and is provided with connections 8 and 9 through which fluid may be circulated into and out of the tank. The apex of the cone 7 is provided with a drain or clean-out opening 10.

In mixing apparatus of the type just referred to, the lower end of the shaft 2 is frequently and generally unsupported so that there will be nothing in the base of the tank to interfere with the rotating and circulating movement of the fluid therein. Conventional forms of bearings and supporting brackets therefor have surfaces which obstruct the movement of fluid and result in a turbulence which is undesirable particularly when the fluid being mixed is a hydro-carbon. Moreover, conventional forms of bearings and supporting brackets therefor would interfere with the downward movement of the fluid to the central opening 10. In a manner which will become apparent, the bearing of this invention and its support eliminates these disadvantages of conventional bearings and supporting brackets therefor.

The bearing unit of this invention comprises a housing 11 in which the lower end 12 of the shaft 2 is received and journaled. The housing 11 is mounted on a supporting ring 13 by plural supporting elements or radially extending struts 14.

As best shown in Fig. 1, the conical bottom 7 of the tank is formed in two parts 7a and 7b which respectively have flanges 15 and 16 which are concentric and face each other. The ring 13 is flat and is clamped between the flanges 15 and 16 to mount it in position. The ring 13, as shown in Figs. 2 and 4, is provided with plural openings 17 which align with similar openings (not shown) in the flanges 15 and 16 through which fastening bolts (not shown) extend to removably secure the bearing unit in position.

In both modifications of the bearing structure shown respectively in Figs. 2 and 4, the radially extending supporting struts 14 are in the form of metal straps which have one side edge 18 extending radially of the housing and mounting ring 13. The outer edges 19 of these straps have a curvature conforming to the inner edge of the ring 13 and have a welded connection therewith. In both modifications, the outer ends of the supporting straps 18 are flat and are positioned in the plane on the mounting ring 13 which is normal to the axis of the shaft 2. Referring now specifically to the modification shown in Figs. 1 and 2, it will be noted that the bearing 11 is spaced axially above the plane of the ring 13. The side edges 20 of the straps 14 which are opposite the side edges 18 extend inwardly a major portion of the strap length substantially parallel to the side edges 18. The inner ends 21 are bent upwardly out of the plane of the mounting ring 13 as best shown in Fig. 1, and are then twisted through an angle of substantially 90° so that the inner end of the edge 18, as at 22, will extend vertically for connection to the housing 11. The vertically extending edge 22 is preferably provided with a welded connection to the housing 11. The inner end of the edges 20 are preferably cut along an angularly extending line 20a as illustrated.

It will be noted that the flat outer ends 23 of the mounting straps 14 present a minimum of surface to the fluid rotating about the axis of the shaft 2, and thus interfere very little with such rotational movement. On the other hand, the inner ends 21 are substantially normal to the rotary movement of such fluid. However, the inner ends 21 are connected with the outer ends 23 by an intermediate strap portion which has a helical curvature, and fluid striking the ends 21 will be gently deflected over the portion 23 and moved outwardly with respect to its rotary path of movement so as to effect an intermingling of the fluid at the center of the tank with the fluid adjacent the edge of the tank. In this manner, the mounting vanes 14 in Figs. 1 and 2 are effective to improve the mixing action, and there are no dead spots in the base of the tank in which fluid may collect without being mixed.

Referring to Fig. 2, it will be noted that the flat portions 23 of the vanes 14 occupy only a small area of the total area within the ring 13. The radial arrangement and formation of these vanes as struts 14 thus provides considerable space through which fluid may flow downwardly to the opening 10 and be drained out of the tank. Such draining movement will take place in substantially the same manner as though the struts 14 were not present.

In the modification shown in Figs. 3 and 4, it will be noted that the base of the housing 11 is positioned in the plane of the mounting ring 13. It will also be noted that the blade elements 14 are shaped somewhat differently. In this modification, the side edges 25 opposite the edges 18 have a gradual curvature which begins at the outer edge 19 and terminates at the inner edge 26. The inner edge 26 extends in a vertical plane and has a welded connection to the housing 11. The shape of the blades 14 in the modification of Figs. 3 and 4 prior to twisting is illustrated in Fig. 5. After the edge 26 is rotated about the edge 18 through an angle of 90°, it is welded to the sides of the housing 11 as shown in Figs. 3 and 4.

The bearing units shown in Figs. 2 and 4 each have the desirable feature of being highly resistant to torque applied to the housing by the rotating shaft. The strength in this respect is due to the flat shape of the outer strut portions 23. In addition, the strut portions 23 may flex slightly in an axial direction under axial loads applied to the bearing housing so that such axial loads are not transmitted directly to the container walls and bottom as would be the case with a conventional bearing rigidly mounted on the container walls. Moreover, in the bearing modification shown in Figs. 1 and 2, limited flexing in a radial direction is provided, and the same is true of the modification in Figs. 3 and 4 although to a more limited extent. It will thus be seen that a container casing is protected by the flexing features of the bearing of this invention in that its side walls need not provide any of the necessary flexing actions. It will thus be seen that the bearing mounting provides limited flexing movement in both axial and radial directions while providing resistance to turning movements. This advantage is provided in addition to the vane-like or liquid flow controlling action of the vanes 14 as has been pointed out above.

Attention is particularly directed to the fact that the flat arrangement of the ring 13 and flanges 15 and 16 facilitates the removal and replacement of the bearing units. In this manner, an enlarged opening may be had conveniently and quickly at the base of the container for cleanout and inspection purposes. Although this feature is designed to be built into new apparatus, attention is directed to the fact that old apparatus may be converted to its application. In the case of old apparatus, it is only necessary to separate the cone 7b by cutting with a torch, and then weld flanges 15 and 16 to the separated edges prior to assembly of the ring 13 in its mounted position.

While we have illustrated and described two preferred embodiments of our invention, it will be understood that this is merely by way of illustration, and that various changes and modifications may be made therein within the contemplation of the invention and under the scope of the following claims.

We claim:

1. In fluid mixing and agitating apparatus having a container tank with a rotatable and vertically extending agitating shaft therein, a bearing housing for the lower end of said shaft, a mounting ring positioned concentrically of said housing and secured to the sides of said tank, and a plurality of metal mounting straps extending radially outwardly of said housing to mount the housing on said ring, each of said straps having a flat outer end lying in a plane normal to the axis of the shaft and connected with said ring, and its inner end having a connection with said housing, said inner end being twisted out of said plane a substantial angle to provide a substantially vertically extending edge at its connection with said housing.

2. In fluid mixing and agitating apparatus having a container tank with a rotatable and vertically extending agitating shaft therein, a bottom for said tank of conical shape formed of two parts having concentric and facing flanges, a flat metal mounting ring clamped between said flanges, a plurality of mounting straps extending radially inwardly from said ring, each of said straps having its outer end flat and in the plane of said mounting ring and connected thereto, and a bearing housing for the lower end of said shaft positioned centrally of said ring, the inner ends of said straps respectively being twisted out of said mounting ring plane and having a connection with said housing to support the housing on said mounting ring.

3. In fluid mixing and agitating apparatus having a container tank with a rotatable and vertically extending agitating shaft therein, a bottom for said tank of conical shape formed of two parts having concentric and facing flanges, a flat metal mounting ring clamped between said flanges, a plurality of mounting straps extending radially inwardly from said ring, each of said straps having its outer end flat and in the plane of said mounting ring and connected thereto, and a bearing housing for the lower end of said shaft positioned centrally of said ring, the inner ends of said straps respectively being turned upwardly out of the plane of said mounting ring to provide an edge extending substantially vertically and having a mounting connection with said housing to support the housing on the mounting ring.

4. In fluid mixing and agitating apparatus, a container tank having a rotating and vertically extending agitating shaft therein, a bearing housing for the lower end of said shaft, and means mounting said housing in said tank comprising a plurality of radially extending deflector vanes, each of said deflector vanes comprising a metal strap having its outer end flat and in a plane normal to the axis shaft and having a supporting connection with the tank, and its inner end twisted out of said plane to provide a substantially vertically extending edge having a supporting connection with the housing, said twisted strap providing a vane structure for deflecting the radial movement of the liquid about said shaft.

5. In fluid mixing and agitating apparatus, a container tank having a rotating and vertically extending agitating shaft therein, a bottom for said tank of conical shape formed of two parts having concentric and facing flanges, a bearing housing for the lower end of said shaft, and means mounting said housing in said tank comprising a flat metal mounting ring clamped between said flanges, and a plurality of radially extending deflector vanes, each of said vanes comprising a mounting strap extending radially inwardly from said ring and having its outer end flat and in the plane of the mounting ring and connected thereto, and its inner end twisted out of the plane of said mounting ring and having a connection with the housing to support the housing on said mounting ring, the twist in said strap providing a vane structure for deflecting the movement of the liquid in a radial direction.

6. A bearing and supporting structure for the lower end of a rotating agitating shaft extending vertically of a tank containing liquid to be mixed comprising a bearing housing in which the lower end of the shaft is receivable, a mounting ring concentric of said housing for connection to the side wall of the tank, and a plurality of flat metal straps extending radially outwardly from said housing to mount the housing on said ring, each of said straps having its outer end connected to said ring and positioned in a plane normal to the axis of said shaft and its inner end twisted a substantial angle out of said plane and connected to said housing.

7. In fluid mixing and agitating apparatus having a container tank with downwardly extending sides and a vertical agitating shaft therein, a bearing unit for the lower end of said shaft comprising a housing in which said lower end is received and journaled, and a plurality of radially extending mounting struts having inner ends connected to said housing and outer ends for connection to said housing, said struts being flat sheet metal straps with said outer ends in a plane normal to the axis of said shaft and said inner ends twisted a substantial angle out of said plane, said struts each having an intermediate portion substantially in the form of a helix connecting said inner and outer ends.

ARNO J. LIEBMAN.
JOSEPH W. DORSEY.

References Cited in the file of this patent

UNITED STATES PATENTS

| Number | Name | Date |
|---|---|---|
| 532,438 | Bergquist | Jan. 15, 1895 |
| 646,686 | Du Bois | Apr. 3, 1900 |
| 736,508 | Edson | Aug. 18, 1903 |
| 860,828 | Shafer | July 23, 1907 |